(12) United States Patent
Erell

(10) Patent No.: US 11,120,795 B2
(45) Date of Patent: Sep. 14, 2021

(54) NOISE CANCELLATION

(71) Applicant: DSP Group Ltd., Herzliya (IL)

(72) Inventor: Adoram Erell, Herzlia (IL)

(73) Assignee: DSP GROUP LTD., Herzliya (IL)

( * ) Notice: Subject to any disclaimer, the term of this patent is extended or adjusted under 35 U.S.C. 154(b) by 0 days.

(21) Appl. No.: 16/445,226

(22) Filed: Jun. 19, 2019

(65) Prior Publication Data

US 2020/0066268 A1 Feb. 27, 2020

Related U.S. Application Data

(60) Provisional application No. 62/722,186, filed on Aug. 24, 2018.

(51) Int. Cl.
*G10L 15/22* (2006.01)
*H04R 3/00* (2006.01)
*G10L 21/0224* (2013.01)
*G10L 21/0208* (2013.01)

(52) U.S. Cl.
CPC .......... *G10L 15/22* (2013.01); *G10L 21/0224* (2013.01); *H04R 3/005* (2013.01); *G10L 2021/02082* (2013.01); *H04R 2410/01* (2013.01)

(58) Field of Classification Search
CPC combination set(s) only.
See application file for complete search history.

(56) References Cited

U.S. PATENT DOCUMENTS

| 7,050,545 | B2 * | 5/2006 | Tanrikulu | H04M 9/082 |
| | | | | 379/406.01 |
| 2004/0002339 | A1 * | 1/2004 | O'Connor | H04L 47/38 |
| | | | | 455/450 |
| 2011/0015923 | A1 * | 1/2011 | Dai | G10L 21/00 |
| | | | | 704/226 |
| 2011/0130176 | A1 * | 6/2011 | Magrath | G10K 11/17885 |
| | | | | 455/570 |
| 2013/0282367 | A1 * | 10/2013 | Wang | G10L 25/78 |
| | | | | 704/210 |
| 2014/0006019 | A1 * | 1/2014 | Paajanen | G10L 21/0216 |
| | | | | 704/233 |
| 2015/0279373 | A1 * | 10/2015 | Hanazawa | G10L 15/222 |
| | | | | 704/275 |
| 2016/0183867 | A1 * | 6/2016 | Rot | H04L 67/10 |
| | | | | 434/185 |
| 2020/0114931 | A1 * | 4/2020 | Rao | G06K 9/00892 |

* cited by examiner

*Primary Examiner* — Duc Nguyen
*Assistant Examiner* — Assad Mohammed
(74) *Attorney, Agent, or Firm* — Reches Patent

(57) ABSTRACT

A method for noise cancellation, the method may include detecting a voice trigger or receiving an indication regarding an occurrence of a voice trigger; searching, based at least on a timing of occurrence of the voice trigger, for at least one of a noise-period and a voice-period; when finding a noise period then updating one or more noise parameters based on one or more features of sensed audio signals received during the noise period; when finding a voice period then updating one or more voice parameters based on one or more features of sensed audio signals received during the voice period; estimating, based on the one or more noise parameters and the one or more voice parameters, a probability that voice is present at one or more subsequent periods; and cancelling noise at the one or more subsequent periods, based on the voice presence probability.

19 Claims, 6 Drawing Sheets

NOISE CANCELLATION

BACKGROUND OF THE INVENTION

A multi-microphone noise canceller (NC) is based on assumed knowledge of the desired signal and noise spatial correlations, i.e., the relative phases and amplitudes of the desired signal and noise in the different microphones (roughly speaking, the spatial correlations represent the direction of arrival and relative amplitudes of the direct and reverberant signal components).

In a realistic scenario, neither the desired signal nor the noise spatial correlations are known a priori and need to be estimated from the total signal (i.e. the sum of desired signal and noise) received in the microphones A first step in this estimation process is an identification of time segments where the desired signal is present and those where it is not.

This identification is typically based on a voice Activity Detection (VAD) algorithm, which uses stationarity and periodicity: The stationarity is assumed a property of the noise while periodicity is assumed present only in parts of the voice signal.

This traditional VAD approach fails when the noise is a non-stationary, quasi-periodic signal like music or other voices. Blind-source-separation (BSS) methods may bring benefits in discriminating between the desired voice and the noise, but those methods require that both the interference and the signal are present for a long enough time, and separation is achieved after sufficient signal has been acquired, resulting in a long delay. Such a delay is not acceptable for real time applications like voice communication with humans or machines.

There is a growing need to provide a NC that can effectively identify and discriminate between time segments where the desired signal is present and time segments where it is not, and where noise is continuously present and the noise may contain interfering signals like music or other voices.

SUMMARY

There may be provided a method for noise cancellation, the method may include detecting a voice trigger or receiving an indication regarding an occurrence of a voice trigger; searching, based at least on a timing of occurrence of the voice trigger, for at least one of a noise-period and a voice period; when finding a noise period then updating one or more noise parameters based on one or more features of sensed audio signals received during the noise period; when finding a voice period then updating one or more voice parameters based on one or more features of sensed audio signals received during the voice period; estimating, based on the one or more noise parameters and the one or more voice parameters, a probability that voice is present at one or more subsequent periods; and cancelling noise at the one or more subsequent periods, based on the voice presence probability.

The detecting of the voice trigger may be executed by a user device that may be voice activated, and wherein the voice parameters are parameters of a voice of a user of the user device.

The method may include buffering features of sensed audio signals received during a buffering period to provide buffered features instead of storing the sensed audio signals received during the buffering period. The buffering period may include at least one out of the noise period and the voice period.

The method may include finding a noise period that immediately preceded a beginning of the voice trigger.

The method may include finding a voice period that immediately precedes an end of the voice trigger.

The method may include determining that a period that immediately preceded a beginning of the voice trigger is not a noise period when a time difference between the voice trigger and a last voice trigger that preceded the voice trigger is below a timing threshold.

The method may include searching for a residual echo period; and when finding a residual echo period then updating one or more residual echo parameters based on one or more features of sensed audio signals received during the residual echo period.

The estimating of the probability that voice is present at the one or more subsequent periods may be also based on the one or more residual echo parameters.

There may be provided a non-transitory computer program product that stores instructions for: detecting a voice trigger or receiving an indication regarding an occurrence of a voice trigger; searching, based at least on a timing of occurrence of the voice trigger, for at least one of a noise-period and a voice-period; when finding a noise period then updating one or more noise parameters based on one or more features of sensed audio signals received during the noise period; when finding a voice period then updating one or more voice parameters based on one or more features of sensed audio signals received during the voice period; estimating, based on the one or more noise parameters and the one or more voice parameters, a probability that voice is present at one or more subsequent periods; and cancelling noise at the one or more subsequent periods, based on the voice presence probability.

The detecting of the voice trigger may be executed by a user device that may be voice activated, and wherein the voice parameters are parameters of a voice of a user of the user device.

The non-transitory computer readable medium may store instructions for buffering features of sensed audio signals received during a buffering period to provide buffered features instead of storing the sensed audio signals received during the buffering period. The buffering period may include at least one out of the noise period and the voice period.

The non-transitory computer readable medium may store instructions for finding a noise period that immediately preceded a beginning of the voice trigger.

The non-transitory computer readable medium may store instructions for finding a voice period that immediately precedes an end of the voice trigger.

The non-transitory computer readable medium may store instructions for determining that a period that immediately preceded a beginning of the voice trigger is not a noise period when a time difference between the voice trigger and a last voice trigger that preceded the voice trigger is below a timing threshold.

The non-transitory computer readable medium may store instructions for searching for a residual echo period; and when finding a residual echo period then updating one or more residual echo parameters based on one or more features of sensed audio signals received during the residual echo period.

The estimating of the probability that voice is present at the one or more subsequent periods may be also based on the one or more residual echo parameters.

There may be provided a device that may include a processing circuit that may be configured to detect a voice trigger or receive an indication regarding an occurrence of a voice trigger; search, based at least on a timing of occurrence of the voice trigger, for at least one of a noise period and a voice period; when finding a noise period then update one or more noise parameters based on one or more features of sensed audio signals received during the noise period; when finding a voice period then update one or more voice parameters based on one or more features of sensed audio signals received during the voice period; estimate, based on the one or more noise parameters and the one or more voice parameters, a probability that voice is present at one or more subsequent periods; and cancel noise at the one or more subsequent periods, based on the voice presence probability.

The device may be a user device that may be voice activated, and wherein the voice parameters are parameters of a voice of a user of the user device.

The device may be configured to buffer features of sensed audio signals received during a buffering period to provide buffered features instead of storing the sensed audio signals received during the buffering period. The buffering period may include at least one out of the noise period and the voice period.

The device may be configured to find a noise period that immediately preceded a beginning of the voice trigger.

The device may be configured to find a voice period that immediately precedes an end of the voice trigger.

The device may be configured to determine that a period that immediately preceded a beginning of the voice trigger is not a noise period when a time difference between the voice trigger and a last voice trigger that preceded the voice trigger is below a timing threshold.

The device may be configured to search for a residual echo period; and when finding a residual echo period then updating one or more residual echo parameters based on one or more features of sensed audio signals received during the residual echo period.

The estimating of the probability that voice is present at the one or more subsequent periods may be also based on the one or more residual echo parameters.

The processing circuit may be one or more integrated circuits, may be a general purpose processor, a central processing unit, a graphical processing unit, a application specific integrated circuit, a field programmable gate array, a hardware accelerator, and the like.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE DRAWINGS

Figure 1:
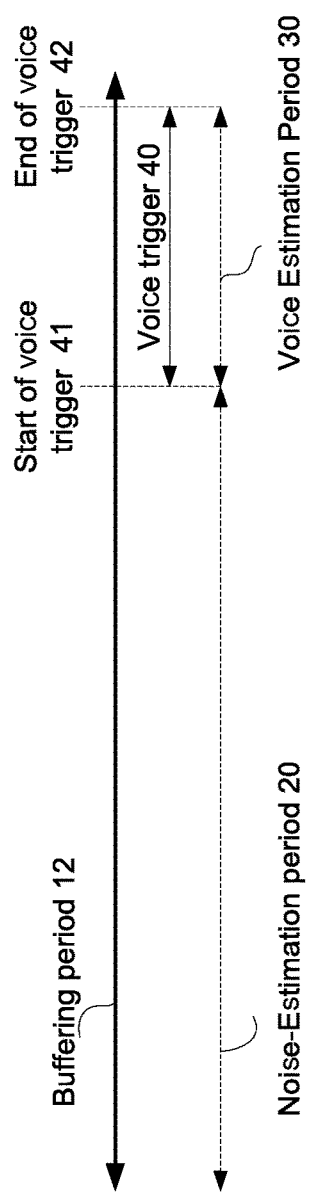
FIG. 1 illustrates an example of a timing diagram.

In the following detailed description, numerous specific details are set forth in order to provide a thorough understanding of the invention. However, it will be understood by those skilled in the art that the present invention may be practiced without these specific details. In other instances, well known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention. Any reference to a system should be applied mutatis mutandis to a reference to a method and to a reference to a non-transitory computer program product—and vice verse.

Voice operated devices (also referred to as voice controlled devices) typically wake up by a voice trigger (VT) which may be a wake up word spoken by the user, and then respond to a following command or query.

In the case of a voice activated device the voice that should activate the device (for example voice of a user of the voice activated device) is a desired signal that should be detected and distinguished from other sounds. The other sounds are referred to as noise.

There is provided a system, a method and a non-transitory computer program product that perform NC—especially learning noise and/or signal properties based on, at least, VT events.

For example—the system may, following a detection of a VT, apply statistical estimation methods to learn the statistical properties of the desired signal and the background noise based on a history of features and the knowledge of the VT start and end timing in that buffer. The history may be stored in a buffering unit that may include one or more buffers.

A buffer or a buffering unit may be any storage unit capable of storing information.

The buffer may store the raw audio samples from one or more microphones to enable a learning of the signal and noise properties, including their spatial correlations.

However, such a buffer may require a large memory. Accordingly, at least some (or all) of the raw data can be replaced by storing one or more features that may be relevant for discriminating between noise and desired signal.

These one or more feature may include at least one out of:
a. Energy (for example—in a logarithmic representation).
b. Periodicity.
c. At least some of the NIFCC coefficients.
d. At least some spectral information—such as low Frequency Filter bank log-energies.
e. Variance of the logarithm of the spectral power.
f. Periodicity (The relative power of periodic component in the signal).

g. Pitch frequency.

The features may be selected and/or changed over time to provide an effective discrimination between sound and noise.

The system may determine that the signals that precede a start of a VT are noise and that signals that follow the VT start (for example till the end of the VT or till a later point in time) represent the desired signal.

FIG. 1-4 are timing diagrams of various scenarios that occur during and around a buffered period.

Features of audio signals are stored in a buffer. At each given time the buffer stores features of audio signals obtained during a buffered period. One or more statistical parameters of noise and/or desired signal and/or echo may be learnt. The outcome of the learning may be used to detect the presence of the voice in one or more future periods.

In the following examples it is assumed, for convenience of explanation, that features of sensed audio signals are buffered while the "raw" sensed audio signals are not buffered.

For convenience of explanation in the following examples and figures the desired signal is called "voice".

FIG. 1 is an example of a buffering period 12 that includes (a) a noise period 20 that preceded a start 41 of a voice trigger 40, and (b) a voice period 30 that ranges between the start 41 and the end 42 of the voice trigger 40.

One or more features related to the noise period 20 may be processed to find one or more noise statistical parameters.

One or more features related to the voice period 30 may be processed to find one or more voice statistical properties.

One or more features related to the voice period 30 and noise period 20 may be processed to find one or more voice and noise statistical properties.

For Example:

TrigMean(i)=mean(x(i)) over the VT period, where x(i)= [feature_i(t1), feature_i(t2), . . . feature_i(tn)] is the sequence of the i-th feature over the buffering period, t1, . . . , tn are the indexes of time frames in the buffering period, and feature_i(tj) is extracted from the signal in the tj time frame.

NoiseMean(i)=mean(x(i)) over the noise period

TrigVar and NoiseVar are similarly computed where "mean" is replaced by "variance".

Disc(i)={AbsoluteValue of [TrigMean(i)−NoiseMean(i)]}/{ sqrt[TrigVar(i)+NoiseVar(i)]}

In this example, Disc(i) serves as a measure of the potential of the i-th feature to discriminate between voice and noise.

Given the statistical properties and discrimination measures learned in the last voice trigger detection, any input signal can be assigned a ratio (LLR) between some likelihood-measure that it originated from voice to the likelihood that it originated from noise, as follows:

$$\text{Log}P(\mathcal{X}\ z|S) = \sum_i \frac{(*z(i) - TrigMean(i))^2}{TrigVar(i)}$$

$$\text{Log}P(\mathcal{X}\ z|N) = \sum_i \frac{(*z(i) - NoiseMean(i))^2}{NoiseVar(i)}$$

$$LLR\pm = \text{Log}P(\mathcal{X}\ z|S) - \text{Log}P(\mathcal{X}\ z|N)$$

Where z is the input signal and z(i) is the i-th feature extracted from the input signal z.

Alternatively, to reduce the effect of irrelevant features, LLR can take into account the discrimination measures Disc(i) by modifying the first two equations as follows:

$$\text{Log}P(z\mathcal{X}\ |S) = \sum_i Disc(i) \frac{(z*(i) - TrigMean(i))^2}{TrigVar(i)}$$

$$\text{Log}P(z\mathcal{X}\ |N) = \sum_i Disc(i) \frac{(z*(i) - NoiseMean(i))^2}{NoiseVar(i)}$$

With this modification different features receive different weights that are proportional to their discrimination capability. For example, if a given feature has a Disc value close to zero because its mean over the noise period and the voice period are equal, it doesn't affect the LLR. As another example, if the mean of a given feature over the noise period is very different than the voice period and its variances in the noise and voice periods are small compared to the difference in the means, it will have a big effect on the LLR.

A user may initiate a voice interaction session with a voice controlled device by generating a sequence that includes (a) a voice trigger (for example "OK Goggle", "Alexa", or any keyword that should be recognized by a voice triggered device) and then (b) (following the voice trigger) a command or text (for example—query) that should be recognized by either the same voice triggered device or by another device that is communicating with it (e.g. a cloud-based attendant).

This voice interaction session may contain multiple voice triggers. In this case the system may not view the periods between any adjacent voice triggers as including only noise, because they may include desired speech. Thus—audio samples acquired in between adjacent voice triggers may not be used for learning pure noise statistics.

The system may determine that a certain noise-period does not contain desired speech in various ways. One way is to decide that the time difference between successive VT's is longer than a certain threshold MinimumTimeFromLast-Trigger (e.g. 15 seconds), then it may be safe to assume that the noise period doesn't contain desired speech. Yet another way is to also rely on an indication from the voice-controlled device to determine whether or not a query has been spoken, and if it has been spoken, when it has ended. Then it may be safe to use the period between the query-end and next VT start as a noise period.

False detections during no user activity will degrade the learning of the voice statistics from a past activity, which will degrade to some extent the detection of a future VT. However, once such a future voice trigger is detected, the following query will not be affected. In any case, since both the noise and the desired signal properties may change over time, it may be advisable to forget the noise and voice statistics after some time (e.g. 1 minute) from the last interaction with the device. Hence, false detections during non-usage time will not degrade performance.

In contrast, false VT detections during a voice-interaction session may have an effect and need to be addressed. Experience shows that they most likely occur on the query. In this case the voice trigger segment will correspond to the user's voice, even if not a true voice trigger, so it can be used to update the voice statistics. The noise period, on the other hand, cannot be trusted since it may contain other parts of the query. This case would most likely appear to the system as adjacent VT's with time-difference shorter than MinimumTimeFromLastTrigger and therefore the noise statistics will anyway not be updated.

Another scenario of a closely following subsequent voice trigger might also occur if the first voice trigger didn't pass a second-level verification stage by the VT detector, so the device didn't respond, in which case the user said the keyword again, and hence the second voice trigger is more reliable. This case would also appear to the system as adjacent VT's with time-difference shorter than MinimumTimeFromLastTrigger and therefore the noise statistics will not be updated.

The optimal value for the MinimumTimeFromLastTrigger is set according to whether the voice-operated device can give a reliable indication of the query-end time, and as a function of the VT false-detection rate.

If the query-end indication is reliable and the VT false-detection rate is low, it can be assumed that the period of pure noise is exactly known. Then the decision on whether or not to update the noise statistics depends on whether this pure noise period is long enough to produce reliable statistics. The threshold MinimumTimeFromLastTrigger would then be set equal to the minimal period required to produce reliable statistics (MinNoisePeriod). This minimal period may be shorter or equal to the length of the noise-estimation period (20).

If, on the other hand the query-end indication is not reliable, or the VT false-detection rate is high, MinimumTimeFromLastTrigger would be set to a high value that is most likely longer than any single voice interaction session (e.g. 30 sec).

Figure 2:
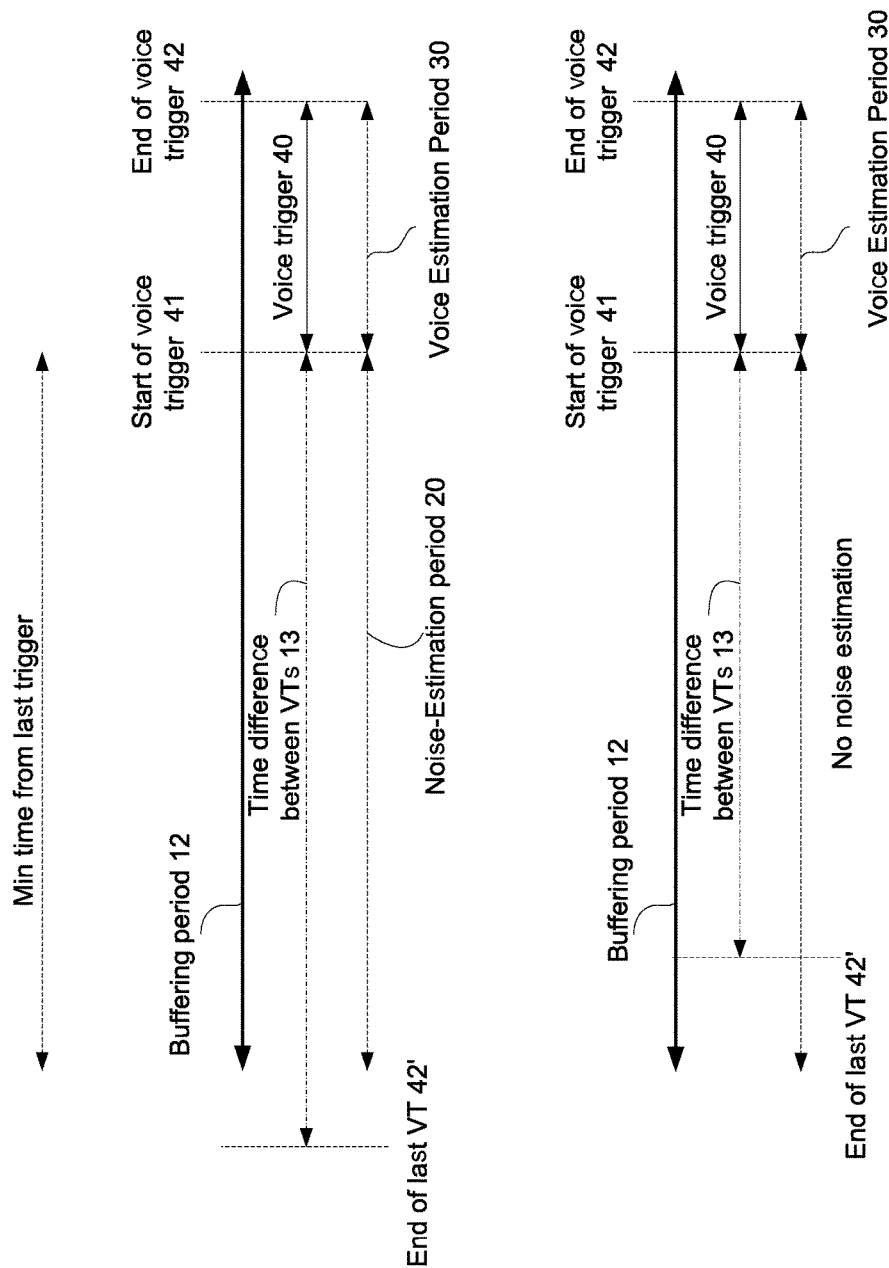
FIG. 2 illustrates an example of a timing diagram.

FIG. 2 for the configuration MinimumTimeFromLastTrigger=noise period=MinNoisePeriod illustrates two scenarios that differ from each other by value of the timing difference 13 between a start 41 of a voice trigger 40 and an end 42' of a last voice trigger that preceded voice trigger 40.

In the upper part of FIG. 2 the timing difference 13 is longer than MinimumTimeFromLastTrigger so that the noise-period is used to estimate the noise statistics.

In the lower part of FIG. 2, the timing different 13 is shorter than MinimumTimeFromLastTrigger so that the noise-period cannot be used for updating noise statistics.

Figure 3:
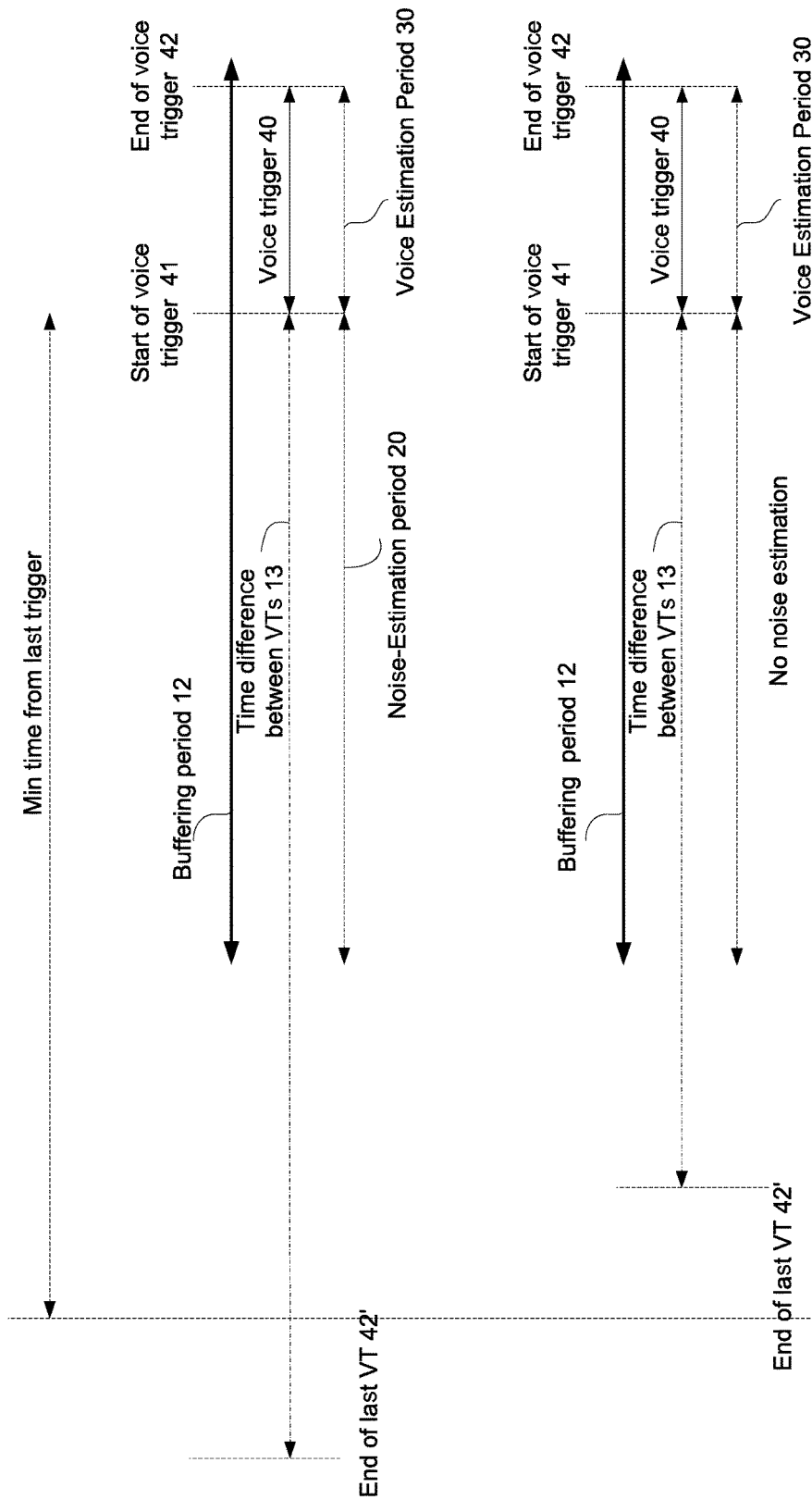
FIG. 3 illustrates an example of a timing diagram.

FIG. 3 for the configuration of longer MinimumTimeFromLastTrigger illustrates two scenarios that differ from each other by value of the timing difference 13 between a start 41 of a voice trigger 40 and an end 42' of a last voice trigger that preceded voice trigger 40.

In the upper part of FIG. 3 the timing difference 13 is longer than MinimumTimeFromLastTrigger so that the noise-period is used to estimate the noise statistics.

In the lower part of FIG. 3, the timing difference 13 is shorter than MinimumTimeFromLastTrigger so that the noise-period cannot be used for updating noise statistics.

One or more features related to the noise period 20 (exists only in the upper part of FIGS. 2 and 3) may be processed to find one or more noise parameters.

One or more features related to the voice period 30 may be processed to find one or more voice parameters.

The method may operate in the presence of interference from the device's loudspeaker, which can originate from the device's playback, i.e. it is playing some sound that is not related to the voice interaction (e.g. the device is a smart speaker). This interference differs from the noise discussed above in that the NC is given an indication when this interference is present. Typically another component of the processor, an echo canceller (EC), cancels part of this interference by methods of echo cancellation, hence this interference is referred to as "residual echo".

Echo is typically present for a long time before the voice interaction session, and is muted when a voice trigger is detected by the voice controlled device to allow the voice controlled device to receive the query or command that follows the voice trigger free of the echo. The capability of the device to detect the VT in the presence of echo is traditionally called "barge-in".

To improve the barge-in capability the NC can be configured to suppress the residual echo in addition to suppressing the noise. In order to suppress the residual-echo the NC needs to estimate the spatial correlations of the residual echo in a similar way it does for the noise. Therefore it needs to discriminate between time periods where only noise is present, periods where only noise and echo are present, and the periods the desired speech is present.

Assuming the timing of echo-presence is known, the system may add "Residual-echo statistical estimation" in addition to "Noise statistical estimation". The estimated residual-echo statistics may be used to identify echo segments that include desired-speech versus echo segments that don't include desired speech in a similar way that desired-speech presence is identified in noise, e.g. using the LLR ratio.

Figure 4:
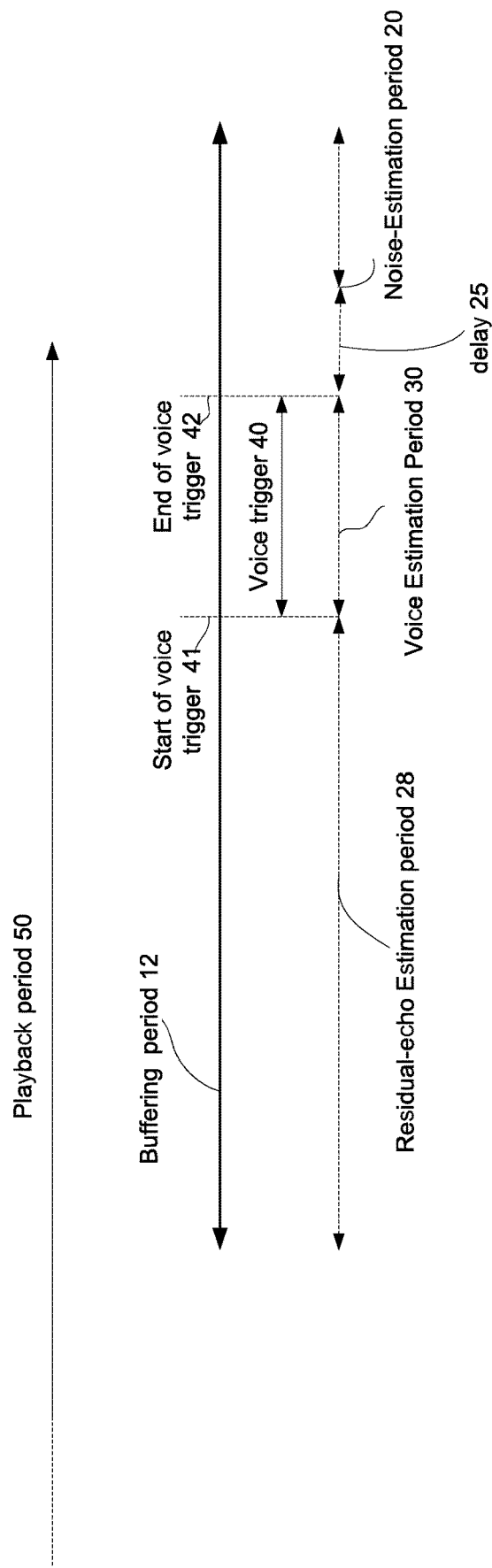
FIG. 4 illustrates an example of a timing diagram.

FIG. 4 illustrates a scenario of a playback period (50) that is paused after the VT detection. The period before the VT is used to estimate the residual-echo statistics (28) instead of the noise statistics.

In order to support a scenario where both residual echo and noise are present, the method may rely on an assumption that a noise-only period, free of both echo and desired speech, occurs after a delay (for example 0.5 second delay) from the detection of the voice trigger, for some short interval (for example, another 0.5 second).

In FIG. 4 a noise period 20 starts after delay period 25 following the end of the voice trigger 40. The delay 25 may be required to allow the playback muting to take effect. The short interval (20) may be assumed to be free of desired signal because the user will most likely pause before issuing his command/query to allow the playback to stop.

Figure 5:
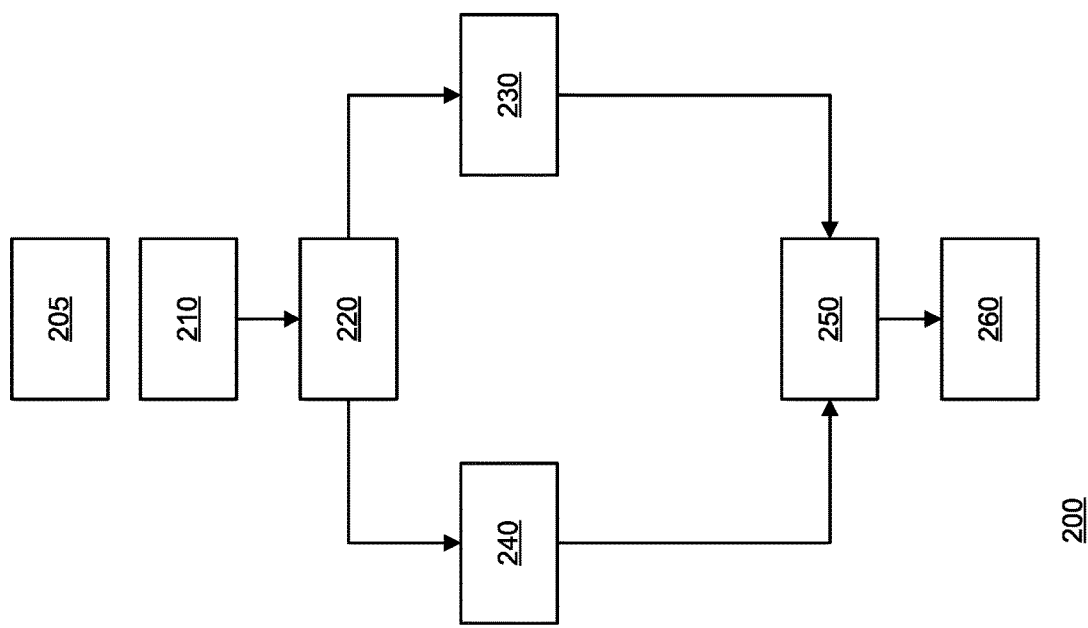
FIG. 5 illustrates an example of a method.

FIG. 5 illustrates an example of a method 200.

In the foregoing description "voice" refers to the desired user speech, "noise" refers to any audio interference that is not indicated as originating from the device loudspeaker, and echo refers to audio that is sounded from the device playback and its presence timing is being indicated.

Method 200 may include:
a. Step 210 of detecting a voice trigger or receiving an indication regarding an occurrence of a voice trigger;
b. Step 220 of searching, based at least on a timing of occurrence of the voice trigger, for at least one of a noise-period and a voice-period.
c. Step 230 of updating (when finding a noise period) one or more noise parameters based on one or more features of sensed audio signals received during the noise period. Initial values of the one or more noise parameters may be received or calculated and the update may occur when a new noise period is detected and/or under any other condition.
d. Step 240 of updating (when finding a voice period) one or more voice parameters based on one or more features of sensed audio signals received during the voice period. Initial values of the one or more voice parameters may be received or calculated and the update may occur when a new voice period is detected and/or under any other condition.

e. Step 250 of estimating, based on the one or more noise parameters and the one or more voice parameters, a probability that voice is present at one or more subsequent periods.

f. Step 260 of cancelling noise at the one or more subsequent periods, based on at least the outcome of step 250.

Step 210 may be executed by a user device that is voice activated. The voice parameters of step 240 may be parameters of a voice of a user of the user device.

Method 200 may also include step 205 of buffering, during a buffering period, features of audio signals. The features of sensed audio signals received during the noise period may be buffered instead of buffering sensed audio signals received during the noise period. The features of sensed audio signals received during the voice period may be buffered instead of buffering sensed audio signals received during the voice period.

Step 220 may include finding a noise period and/or finding a voice period.

Step 220 may include finding a noise period that immediately preceded a beginning of the voice trigger.

Step 220 may include finding a voice period that immediately precedes an end of the voice trigger.

Step 220 may include determining that a period that immediately preceded a beginning of the voice trigger is not a noise period when a time difference between the voice trigger and a last voice trigger that preceded the voice trigger is below a timing threshold.

Step 220 may include searching for a residual echo period.

Figure 6:
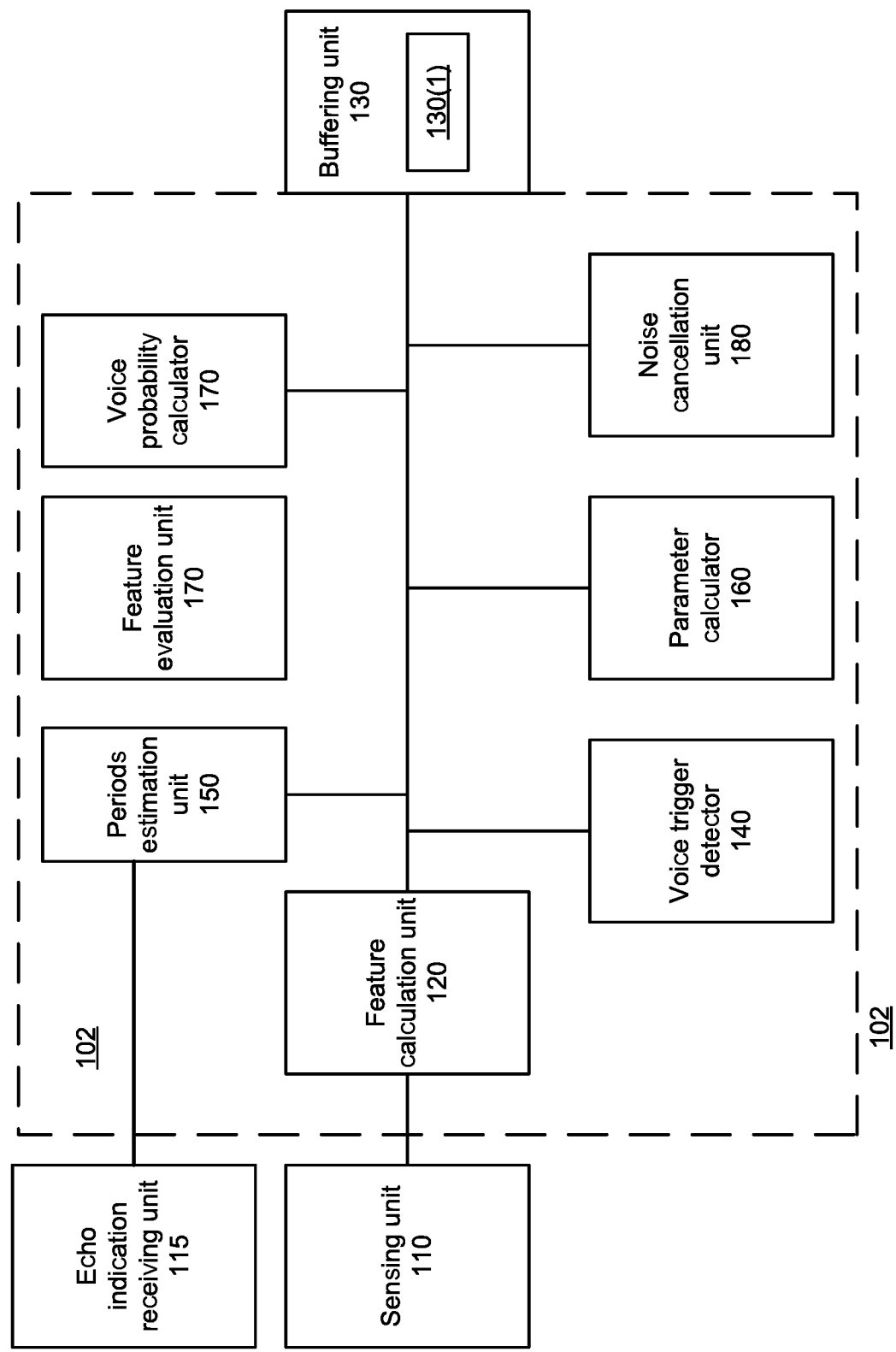
FIG. 6 illustrates an example of a device.

Method 200 may include updating (when finding a residual echo period) one or more residual echo parameters based on one or more features of sensed audio signals received during the residual echo period. In this case step 260 may also be based on the one or more residual echo parameters FIG. 6 illustrates an example of device 100.

Device 100 may be configured to execute method 200.

Device 100 may include a sensing unit 110 that may include one or more microphones for sensing the sensed audio signals, an echo-indication receiving unit 115, a buffering unit 130 that may include one or more buffers and a processing circuit 102 that may include at least one out of:

a. Feature calculating unit 120 that is configured to calculate one or more features of sensed audio signals.

b. Voice trigger detector 140 configured to detect a voice trigger.

c. Periods estimation unit 150 for searching for at least one of a noise period and a voice period.

d. Parameter calculation unit 160 that is configured to estimate one or more noise parameter, one or more voice parameter, one or more echo parameter, one or more discrimination parameters, and the like.

e. Voice probability calculator 170 that continuously estimates the probability that voice is present in the received audio f. Noise cancellation unit 180 that is configured to perform noise cancellation.

Feature evaluation unit 190 that is configured to evaluate the efficiency of the features in distinguishing between noise and voice.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner. The integrated circuit may be a system on chip, a general-purpose processor, a signal processor, an FPGA, a neural network integrated circuit, and the like.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'may include' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for noise cancellation, the method comprises:
    detecting a voice trigger or receiving an indication regarding an occurrence of a voice trigger;
    searching, based at least on a timing of occurrence of the voice trigger, for at least one of a noise period and a voice period;
    when finding a noise period then updating one or more noise parameters based on one or more features of sensed audio signals received during the noise period;
    when finding a voice period then updating one or more voice parameters based on one or more features of sensed audio signals received during the voice period;
    estimating, based on the one or more noise parameters and the one or more voice parameters, a probability that voice is present at one or more subsequent periods;
    cancelling noise at the one or more subsequent periods, based on the voice presence probability; and
    forgetting the one or more noise parameters and the one or more voice parameters following a last interaction of a user with the device.

2. The method according to claim 1, wherein the detecting of the voice trigger is executed by a user device that is voice activated, and wherein the voice parameters are parameters of a voice of a user of the user device.

3. The method according to claim 1, comprising buffering features of sensed audio signals received during a buffering period to provide buffered features instead of storing the sensed audio signals received during the buffering period; wherein the buffering period comprises at least one out of the noise period and the voice period.

4. The method according to claim 1, comprising finding a noise period that immediately preceded a beginning of the voice trigger.

5. The method according to claim 1, comprising finding a voice period that immediately precedes an end of the voice trigger.

6. The method according to claim 1, comprising determining that a period that immediately preceded a beginning of the voice trigger is not a noise period when a time difference between the voice trigger and a last voice trigger that preceded the voice trigger is below a timing threshold.

7. The method according to claim 1, comprising searching for a residual echo period; and when finding a residual echo period then updating one or more residual echo parameters based on one or more features of sensed audio signals received during the residual echo period.

8. The method according to claim 7, wherein the estimating of the probability that voice is present at the one or more subsequent periods is also based on the one or more residual echo parameters.

9. A non-transitory computer readable medium that stores instructions for:
    detecting a voice trigger or receiving an indication regarding an occurrence of a voice trigger;
    searching, based at least on a timing of occurrence of the voice trigger, for at least one of a noise-period and a voice-period;
    when finding a noise period then updating one or more noise parameters based on one or more features of sensed audio signals received during the noise period;
    when finding a voice period then updating one or more voice parameters based on one or more features of sensed audio signals received during the voice period;
    estimating, based on the one or more noise parameters and the one or more voice parameters, a probability that voice is present at one or more subsequent periods; and
    cancelling noise at the one or more subsequent periods, based on the voice presence probability; and
    forgetting the one or more noise parameters and the one or more voice parameters following a last interaction of a user with the device.

10. The non-transitory computer readable medium according to claim 9, wherein the detecting of the voice trigger is executed by a user device that is voice activated, and wherein the voice parameters are parameters of a voice of a user of the user device.

11. The non-transitory computer readable medium according to claim 9, that stores instructions for buffering features of sensed audio signals received during a buffering period to provide buffered features instead of storing the sensed audio signals received during the buffering period; wherein the buffering period comprises at least one out of the noise period and the voice period.

12. The non-transitory computer readable medium according to claim 9, that stores instructions for finding a noise period that immediately preceded a beginning of the voice trigger.

13. The non-transitory computer readable medium according to claim 9, that stores instructions for finding a voice period that immediately precedes an end of the voice trigger.

14. The non-transitory computer readable medium according to claim 9, that stores instructions for determining that a period that immediately preceded a beginning of the voice trigger is not a noise period when a time difference between the voice trigger and a last voice trigger that preceded the voice trigger is below a timing threshold.

15. The non-transitory computer readable medium according to claim 9, that stores instructions for searching for a residual echo period; and when finding a residual echo period then updating one or more residual echo parameters based on one or more features of sensed audio signals received during the residual echo period.

16. The non-transitory computer readable medium according to claim 15, wherein the estimating of the probability that voice is present at the one or more subsequent periods is also based on the one or more residual echo parameters.

17. A device comprising a processing circuit that is configured to:
    detect a voice trigger or receive an indication regarding an occurrence of a voice trigger;
    search, based at least on a timing of occurrence of the voice trigger, for at least one of a noise period and a voice period;
    when finding a noise period then update one or more noise parameters based on one or more features of sensed audio signals received during the noise period;
    when finding a voice period then update one or more voice parameters based on one or more features of sensed audio signals received during the voice period;
    estimate, based on the one or more noise parameters and the one or more voice parameters, a probability that voice is present at one or more subsequent periods;
    cancel noise at the one or more subsequent periods, based on the voice presence probability; and
    forget the one or more noise parameters and the one or more voice parameters following a last interaction of a user with the device.

18. The device according to claim 17, wherein the voice trigger is a wake up word spoken by a user.

19. The method according to claim 1, wherein the voice trigger is a wake up word spoken by a user.

\* \* \* \* \*